United States Patent
Dahlmeier et al.

(10) Patent No.: US 11,281,989 B2
(45) Date of Patent: Mar. 22, 2022

(54) MACHINE LEARNING FRAMEWORK FOR FACILITATING ENGAGEMENTS

(71) Applicant: SAP SE, Walldorf (DE)

(72) Inventors: Daniel Hermann Richard Dahlmeier, Singapore (SG); Ruidan He, Singapore (SG); Wenya Wang, Singapore (SG); Kham Sian Mung, Singapore (SG); Mohamed Yusuf Abdul Gafoor, Singapore (SG); Yi Qing Isaac New, Singapore (SG); Weile Chen, Singapore (SG); Hang Guo, Singapore (SG); Haodan Yang, Singapore (SG); Abraham Sasmito Adibowo, Singapore (SG)

(73) Assignee: SAP SE, Walldorf (DE)

( * ) Notice: Subject to any disclaimer, the term of this patent is extended or adjusted under 35 U.S.C. 154(b) by 1125 days.

(21) Appl. No.: 15/451,428

(22) Filed: Mar. 7, 2017

(65) Prior Publication Data
US 2018/0260693 A1   Sep. 13, 2018

(51) Int. Cl.
*G06N 20/00*   (2019.01)
*G06Q 10/06*   (2012.01)
*G06Q 30/02*   (2012.01)

(52) U.S. Cl.
CPC ......... *G06N 20/00* (2019.01); *G06Q 10/0631* (2013.01); *G06Q 30/0282* (2013.01)

(58) Field of Classification Search
CPC . G06N 20/00; G06Q 10/0631; G06Q 30/0282
See application file for complete search history.

(56) References Cited

U.S. PATENT DOCUMENTS

| | | | |
|---|---|---|---|
| 10,320,633 B1* | 6/2019 | Wong | H04L 67/02 |
| 2008/0313110 A1* | 12/2008 | Kreamer | G06Q 10/06 706/12 |
| 2010/0010872 A1* | 1/2010 | Drummond | G06Q 10/0637 705/7.36 |
| 2015/0112756 A1* | 4/2015 | Subramanian | G06Q 30/0201 705/7.29 |
| 2016/0284012 A1* | 9/2016 | Hom | G06Q 30/0635 |
| 2017/0024640 A1* | 1/2017 | Deng | G06N 3/04 |
| 2017/0255999 A1* | 9/2017 | Amaral | G06Q 40/08 |

(Continued)

OTHER PUBLICATIONS

Finn C. Kuusisto, Machine Learning for Medical Decision Support and Individualized Treatment Assignment, Aug. 14, 2015, pp. 1-169, University of Wisconsin-Madison Computer Sciences Department, USA.

(Continued)

*Primary Examiner* — Kamran Afshar
*Assistant Examiner* — Ryan C Vaughn
(74) *Attorney, Agent, or Firm* — Klarquist Sparkman, LLP (57) ABSTRACT

Described herein is a machine learning framework for facilitating engagements. In accordance with one aspect of the framework, a machine learning model is trained based on the training data. A recommendation associated with an opportunity record may then be generated using the trained machine learning model. Results of one or more actions performed in response to the recommendation may be collected and fed back to the machine learning model to be used as the training data.

16 Claims, 6 Drawing Sheets

(56) References Cited

U.S. PATENT DOCUMENTS

2018/0089585 A1\* 3/2018 Rickard, Jr ............ G06N 20/00
2018/0181641 A1\* 6/2018 Das ...................... G06K 9/6215

OTHER PUBLICATIONS

Wikipedia, Grand Prize awarded to team BellKor's Pragmatic Chaos, Netflix Prize, Sep. 18, 2009, pp. 1-7, Wikipedia, https://en.wikipedia.org/wiki/Netflix_Prize.

Mukhammad Andri Setiawan et al., Facilitating Business Process Improvement through Personalized Recommendation, Business Information Systems, Jun. 15-17, 2011, pp. 136-147, vol. 87, Springer Berlin Heidelberg, Germany.

Unboxed Technology, Don't Leave Your Sales to Chance, Assistant: The Guided Selling Tool that Helps Your Sales Force Sell More, May 30, 2016, pp. 1-7, Unboxed Technology, https://www.unboxedtechnology.com/products/assistant/.

Fetiveau, T., et al., Franchise for Success Handbook, SAP GCO Franchise for Success, 2015, pp. 1-9, https://jam4.sapjam.com/groups/6vY2qZwPCLwtwPKjnarxop/documents/BOOKYSfabMxoXgXj5ewrx2/slide_viewer.

\* cited by examiner

| MY OPEN OPPORTUNITIES 5 ⓥ | | | | | | | |
|---|---|---|---|---|---|---|---|
| MLP% | Name | Recommedation | Account | Close Date | Sales Phase | Owner | Status |
| 96 | Ocean Freight ADIDAS | Develop solution p | | | Identify opportunity | Phil Hughes | Open |
| 53 | Green Mile Opp | Negotiate contract | Based on your previous action, | | Develop value prop. | Mike Summers | Open |
| 35 | Q4 Opp for Green Mile | Define selling team | Create meeting to negot. contract | | Identify opportunity | Mike Summers | Open |
| 75 | Q4 Deal for Green Mile | Clarify feasibility | Is likely to move this deal forward | | Identify opportunity | Mike Summers | Open |
| 87 | Jam Opportunity | Remind prospect | Like to improve recommendation  [Create] | | | | |

MACHINE LEARNING FRAMEWORK FOR FACILITATING ENGAGEMENTS

TECHNICAL FIELD

The present disclosure relates generally to computer systems, and more specifically, to a machine learning framework for facilitating engagements.

BACKGROUND

Enterprise sales is a complex domain. In a typical engagement, there are many stakeholders to entertain, regulations to adhere to, negotiation activities, and customization of the product (or service) to be delivered. Such requirements need to be satisfied while maintaining a sense of consistency in the customer experience to maintain the franchise's brand equity. Additionally, there are region-specific engagement guidelines, product-specific constraints, and country-specific compliance requirements.

Since different organizations have their own unique processes, inducting new salespeople is substantially challenging in the enterprise sales domain. Workforce attrition also leads to great loss in organizational knowledge. If such process knowledge is not properly formalized, turnover of customer-facing employees may likely result in brand dilution. Therefore, organizations need effective ways to extract, distill, and disseminate expertise as part of a continuous improvement and brand-building process.

However, generating sales is a competitive sport. Typically, each sales engagement is a zero-sum game: when a company wins a deal, someone else has to lose it. Ironically, some organizations also practice zero-sum competition within the company—that is, one salesperson's victory means defeat of his peers. Practices (e.g., fixed bonus pools, forced distribution) or even a saturated market may promote predatory behavior. High levels of intra-company competition tend to discourage employees from sharing their knowledge and up-skilling their peers. In turn, this impairs organizational learning and can cause brand destruction when it reaches a tipping point.

SUMMARY

A machine learning framework for facilitating engagements is described herein. In accordance with one aspect of the framework, a machine learning model is trained based on the training data. A recommendation associated with an opportunity record may then be generated using the trained machine learning model. Results of one or more actions performed in response to the recommendation may be collected and fed back to the machine learning model to be used as the training data.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A machine learning framework for facilitating engagements is described herein. In accordance with one aspect, the machine-learning framework makes recommendations for actions to be performed during engagements (e.g., customer or sales engagements) and continuously improves itself by monitoring such engagements and gaining more data. When deployed fully, the framework may function as an active knowledge base that stores organizational knowledge and performs real-time continuous process improvements. This is a significant improvement over traditional process improvement efforts that are normally performed annually or even less frequently.

The machine-learning framework may assist users (e.g., salespeople) in formulating their actions during engagements. The machine-learning framework may provide an interactive deal playbook (or other sales tool) that guides a salesperson's activities (or actions) with stakeholders during deal-making. Data may be collected from a Customer Relationship Management (CRM) system for each engagement and be processed to guide future engagements. Over time, the aggregated data may shape the organization's knowledge base and day-to-day activities as the model learns, and personalized "best practices" may be distributed to salespeople. The framework advantageously functions as the ultimate keeper of organizational knowledge and practices in a high-attrition or predatory working environment. In some implementations, the playbook, CRM system, machine-learning model and salespeople form a closed-loop system that ensures that knowledge is kept within the organization and that it is substantially insusceptible to employee turnover. A fully-automatic feedback loop may be provided to achieve continuous self-learning and process improvement in the domain of high-touch high-value business-to-business sales engagements.

It should be appreciated that the framework described herein may be implemented as a method, a computer-controlled apparatus, a computer process, a computing system, or as an article of manufacture such as a computerusable medium. These and various other features and advantages will be apparent from the following description.

Figure 1:
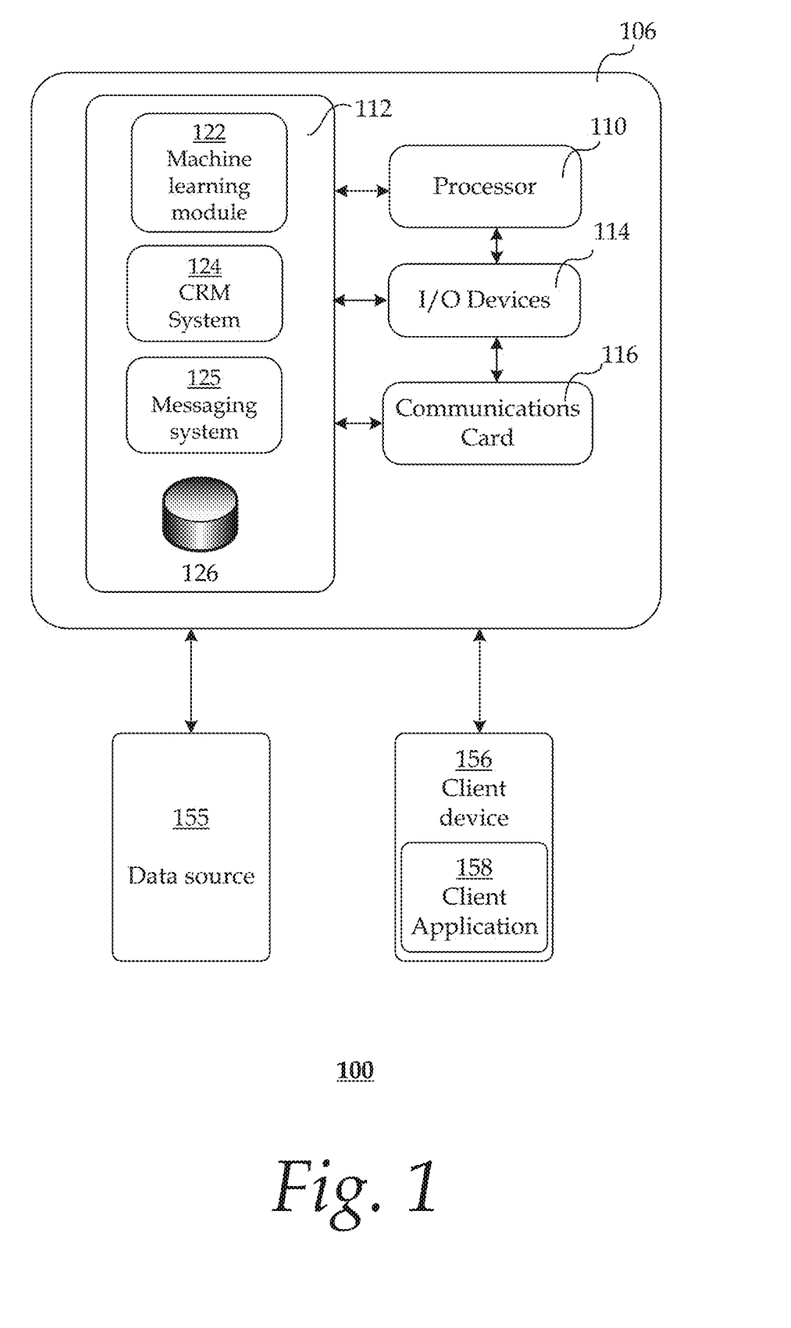
FIG. 1 is a block diagram illustrating an exemplary architecture.

FIG. 1 is a block diagram illustrating an exemplary architecture 100 in accordance with one aspect of the present framework. Generally, exemplary architecture 100 may include a computer system 106, a data source 155, and one or more client devices 156.

Computer system 106 is a server capable of responding to and executing instructions in a defined manner. Computer system 106 may include a processor 110, input/output (I/O) devices 114 (e.g., touch screen, keypad, touch pad, display screen, speaker, etc.), a memory module 112 and a communications card or device 116 (e.g., modem and/or network adapter) for exchanging data with a network (e.g., local area network or LAN, wide area network or WAN, Internet, etc.). It should be appreciated that the different components and sub-components of the computer system 106 may be located or executed on different machines or systems. For example, a component of the memory module 112 may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG; Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes a machine learning module 122, a customer relationship management (CRM) system 124, a messaging system 125 and a database 126. It should be appreciated that one or more of these components may also reside in other computer systems that are communicatively coupled to computer system 106. For example, CRM system 124 may reside in another computer system and communicate with a partner database.

In some implementations, computer system 106 processes data (e.g., playbooks) retrieved from data source 155. Computer system 106 may distribute processed data or information, via messaging system 125, to a client device 156 (e.g., smartphone, smart device, laptop, headset, computer). Such client device 156 may include client application 158 configured to present a user interface (e.g., graphical user interface) to access the information and services (e.g., recommendations) provided by computer system 106. The client device 156 may be used by, for example, a salesperson, sales manager or other end user.

Figure 2:
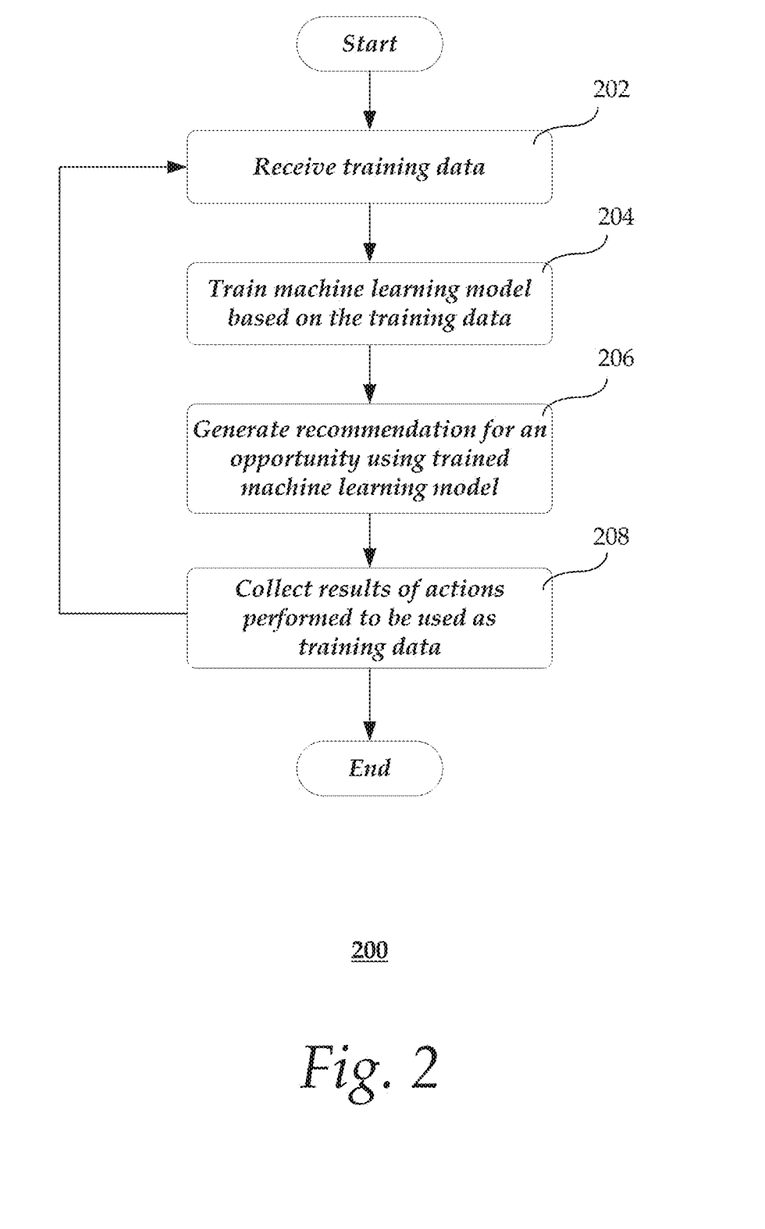
FIG. 2 shows an exemplary method for facilitating engagements.

FIG. 2 shows an exemplary method 200 for facilitating engagements. The method 200 may be performed automatically or semi-automatically by the system 106, as previously described with reference to FIG. 1. It should be noted that in the following discussion, reference will be made, using like numerals, to the features described in FIG. 1.

At 202, machine learning module 122 receives training data. A large amount of training data may be retrieved from CRM system 124, database 126 and/or data source 155. The training data may include, but is not limited to, customer (or partner) data (e.g., companies, employees), user organization data (e.g., priorities, best practices), opportunity (or lead) records, historical communication data (e.g., e-mail, recordings of conference calls, minutes of meetings), historical engagements, historical playbooks applied, historical actions taken, results of playbooks, results of actions taken, and so forth.

Historical data (e.g., playbooks, actions, etc.) refers to information associated with engagements that have been completed or have resulted in an outcome (e.g., sales deal is won or lost). A "playbook" describes a general strategy to approach a sales opportunity, and includes a set of one or more recommended actions to perform in the current engagement with the prospective customer. The playbook may further include, for example, a sales process matrix, common problems and solutions, actions to take, product mix, etc. The sales opportunity is described by an opportunity record that may be created, managed and stored by the CRM system 124. The opportunity record may include, for example, information about parties (e.g., prospective customer) involved, customer problem, applied playbooks, etc.

At 204, machine learning module 122 trains a machine learning model based on the training data. In some implementations, the machine learning model is a semisupervised deep learning model. Exemplary models include, but are not limited to, neural networks, genetic algorithms, random decision forests, other stochastic methods, or a combination thereof. A semi-supervised learning model is trained using supervised learning techniques that also make use of both labeled and unlabeled data for training. Labeled data may include, for example, an initial set of play books created by one or more users (e.g., sales manager), as well as new playbooks recommended by the present framework that are provided in a feedback loop. The supervision functions as an emergency stop button should the framework's recommendation go "the wrong way" (i.e., defined by the user as "wrong").

At 206, machine learning module 122 uses the trained machine learning model to generate a recommendation associated with an opportunity record for a current (or open) opportunity. In some implementations, the recommendation describes the next action for a user to take for the current opportunity. In some implementations, a win or lose probability associated with the recommendation is also generated. A win probability may indicate the likelihood of a successful opportunity to sales conversion upon performing the recommended action. Additionally, or alternatively, a playbook may also be recommended. The recommendation may be distributed to, for example, a client device 156. More details of this step will be provided herein with reference to FIGS. 3-6.

At 208, actions taken by the users and results of such actions are collected and fed back to machine learning module 122 as training data to further train the machine learning model to improve subsequent recommendations. Such actions may have been taken by the user in response to the recommendation provided by the present framework. The results describe the outcome of the action (i.e., whether the action resulted in, for example, a successful or failed conversion of an opportunity into a sales transaction). Other measures of results may also be used. Information of such actions and/or results thereof may be acquired from the user via, for example, client device 156. A user interface at the user device 156 may enable the user to enter the relevant information.

The method 200 may then return to 202 to repeat steps 202, 204, 206 and 208 to continuously provide training data to improve and train the machine learning model and generate subsequent recommendations. Training data may be continuously fed-back (e.g., from sales persons) during engagements with, for example, customers or potential customers.

Figure 3:
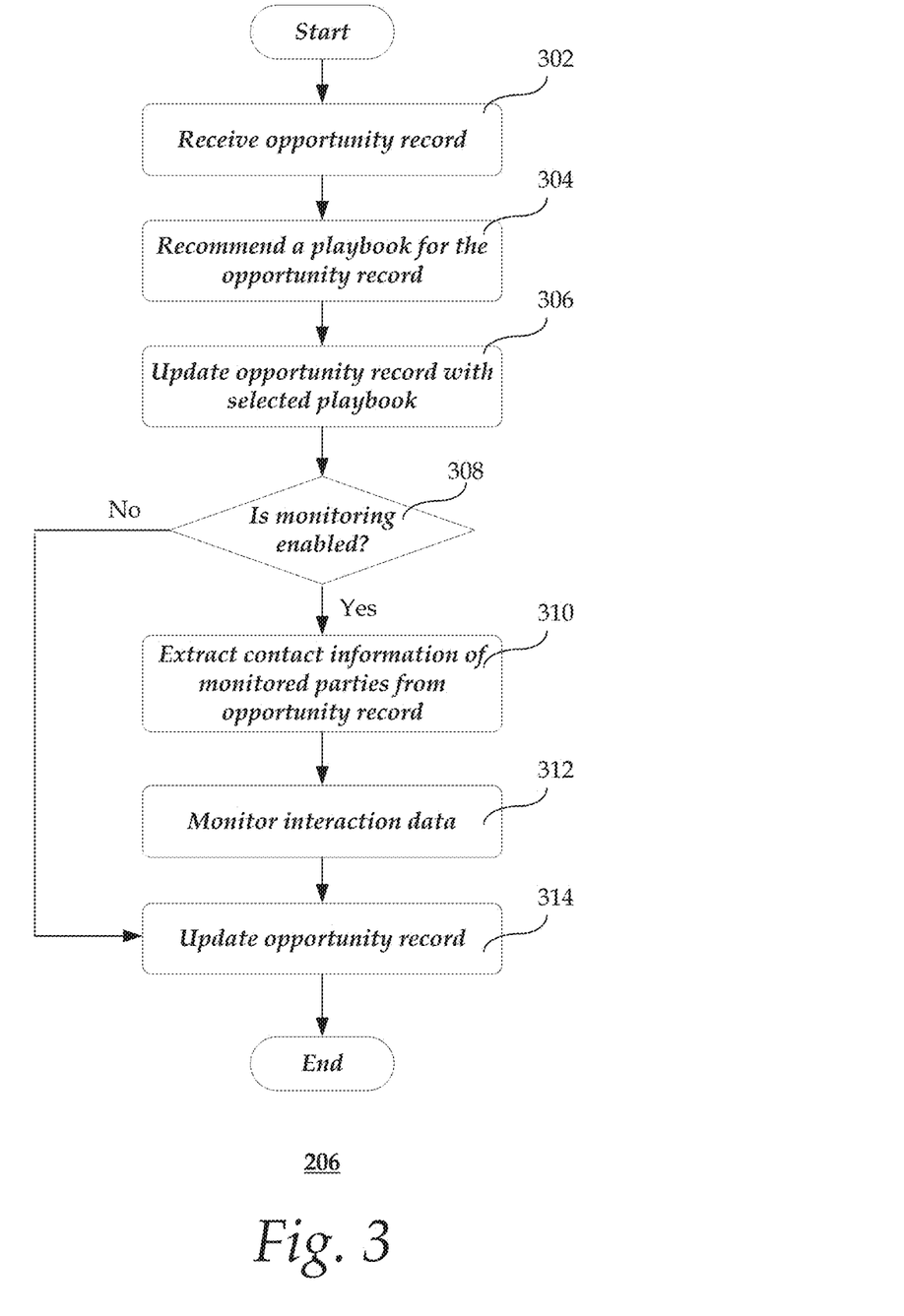
FIG. 3 shows an exemplary method of generating a recommendation using the trained machine learning model.

FIG. 3 shows an exemplary method 206 of generating a recommendation using the trained machine learning model. The method 206 may be performed automatically or semi-automatically by the system 106, as previously described with reference to FIG. 1. It should be noted that in the following discussion, reference will be made, using like numerals, to the features described in FIGS. 1 and 2.

At 302, machine learning module 122 receives an opportunity record. In some implementations, the opportunity record is received from CRM system 124. A user (e.g., sales person or manager) may create or select an existing opportunity record via, for example, a client device 156 communicatively coupled to the CRM system 124. As discussed previously, the opportunity record may store, for example, attributes associated with parties (e.g., prospective customer) involved in an engagement, customer problem, applied playbooks, buying center, etc. The opportunity record may be assigned a "draft" status while it is being updated.

At 304, machine learning module 122 recommends a playbook for the opportunity record. Machine learning module 122 may parse the opportunity record to extract one or more attributes to be input into the trained machine learning model. The trained machine learning model may then generate a playbook based on the one or more input attributes.

At 306, CRM system 124 updates the opportunity record with a playbook selected by the user. In some implementations, the recommended playbook is presented to the user via, for example, client device 156. The user may select the recommended playbook or another one as the initial playbook. CRM system 124 then updates the opportunity record with the selected playbook.

At 308, CRM system 124 determines whether monitoring of interaction data has been enabled. Interaction data (e.g., e-mail text, telephone conversation, text messages, facsimile paper, social media messages) between the parties in an engagement (e.g., user, salesperson, co-worker, potential customer) associated with the current opportunity record may be monitored and logged for use in machine learning. In some implementations, CRM system 124 presents a notification at, for example, client device 156, to enable a user to opt in or out of the monitoring.

At 310, in response to the opting in to the monitoring, the machine learning module 122 extracts contact information of monitored parties from the opportunity record, and sends such contact information to the messaging system 125 to monitor the interaction data communicated between the monitored parties. Such contact information identifies the communication channels (e.g., email address accounts, telephone numbers) of the parties to be monitored.

At 312, messaging system 125 monitors interaction data communicated between the monitored parties via the communication channels identified in the contact information. In some implementations, messaging system 125 performs monitoring based on pre-defined rules. For example, when messaging system 125 detects interaction data between monitored parties, messaging system 125 forwards the interaction data to the machine learning module 122 to extract relevant information associated with the opportunity record. Machine learning module 122 may also match the extracted information with other existing opportunity records.

In an exemplary scenario, whenever a message (e.g., email, telephone conversation) occurs between two individuals involved in an opportunity (as described by the opportunity record), there is a high likelihood that it is about the opportunity that they are working in. Suppose that Tim is a salesperson of Company A and is working on Deal X for Company B and his contact person from Company B is Bob. If an email from Bob's email account address bob@companyb.com arrives for Tim at tim@companya.com, the content is likely to be about Deal X. The e-mail messaging system at @companya.com may detect the message involving this pair of monitored individuals and send a copy of the message to the machine learning module 122 for further processing.

At 314, CRM system 124 updates and stores the opportunity record in the CRM system 124. The opportunity record may be updated with information extracted from the interaction data. The extracted information may include, for example, what the customer was asking for (e.g., enquiries, constraints, requirements), response of the salesperson (e.g., offerings, confirmation), result of the interaction (e.g., confirmation of certain aspects, increased or decreased demand of information for a certain product), and so forth. In addition, the trained machine learning model may be applied to the extracted information to generate a recommendation of, for example, the next action to take.

Figure 4:
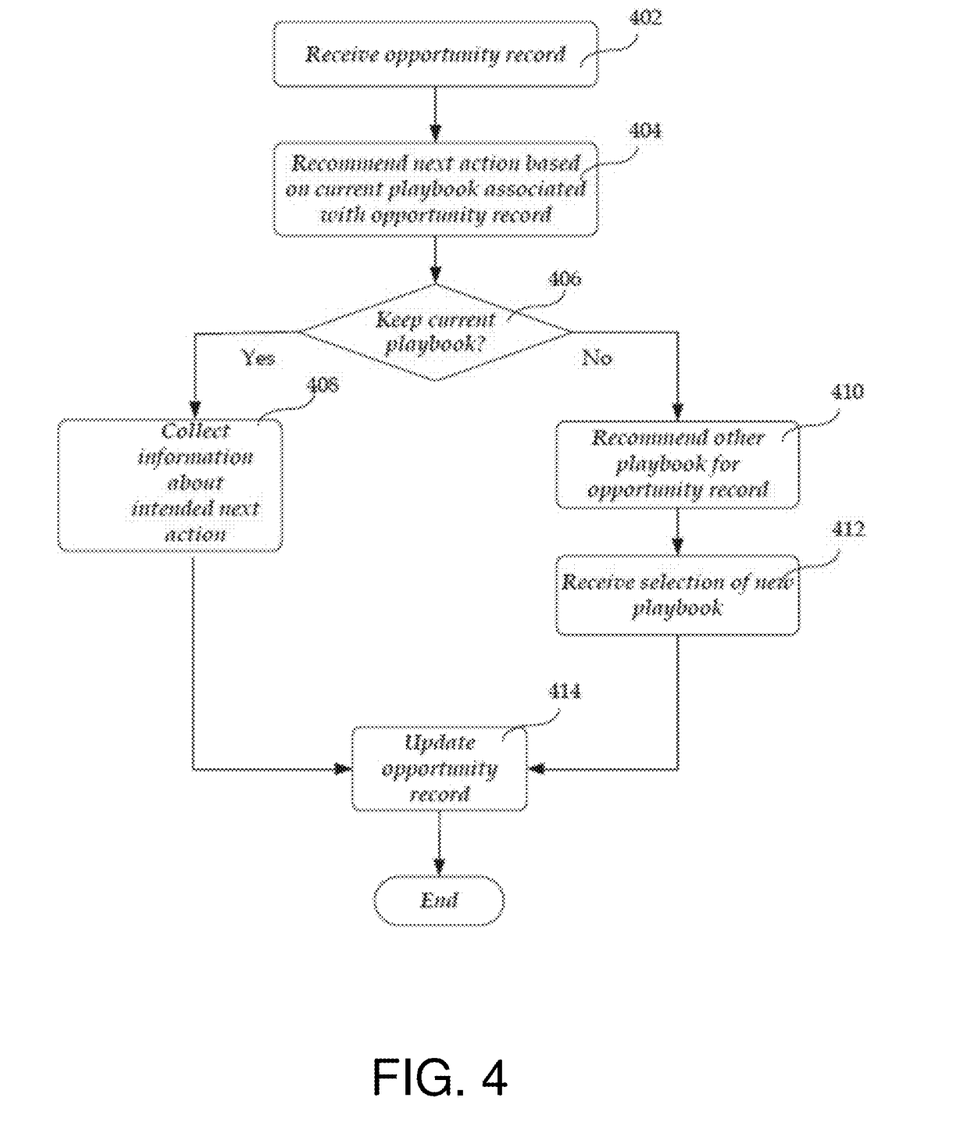
FIG. 4 shows another exemplary method of generating a recommendation using the trained machine learning model.

FIG. 4 shows another exemplary method 206 of generating a recommendation using the trained machine learning model. The method 206 may be performed automatically or semi-automatically by the system 106, as previously described with reference to FIG. 1. It should be noted that in the following discussion, reference will be made, using like numerals, to the features described in FIGS. 1 and 2.

At 402, machine learning module 122 receives an opportunity record. In some implementations, the opportunity record is retrieved from a CRM system 124. A user may select the opportunity record for review via, for example, client device 156. The opportunity record may be associated with a current playbook that is employed for the ongoing opportunity. The current playbook may be marked as, for example, "currently selected" in the opportunity record. When this opportunity is completed (e.g., deal is won or lost), all actions that were taken are collected and processed to create a new playbook, which can be used in subsequent engagements (i.e. opportunities).

At 404, machine learning module 122 recommends the next action based on the current playbook associated with the opportunity record. More particularly, machine learning module 122 may extract information of all known actions of the opportunity record, compare these actions to the current playbook actions, and apply the trained machine learning model to the extracted information and the current playbook to generate the next action recommendation.

Figure 5:
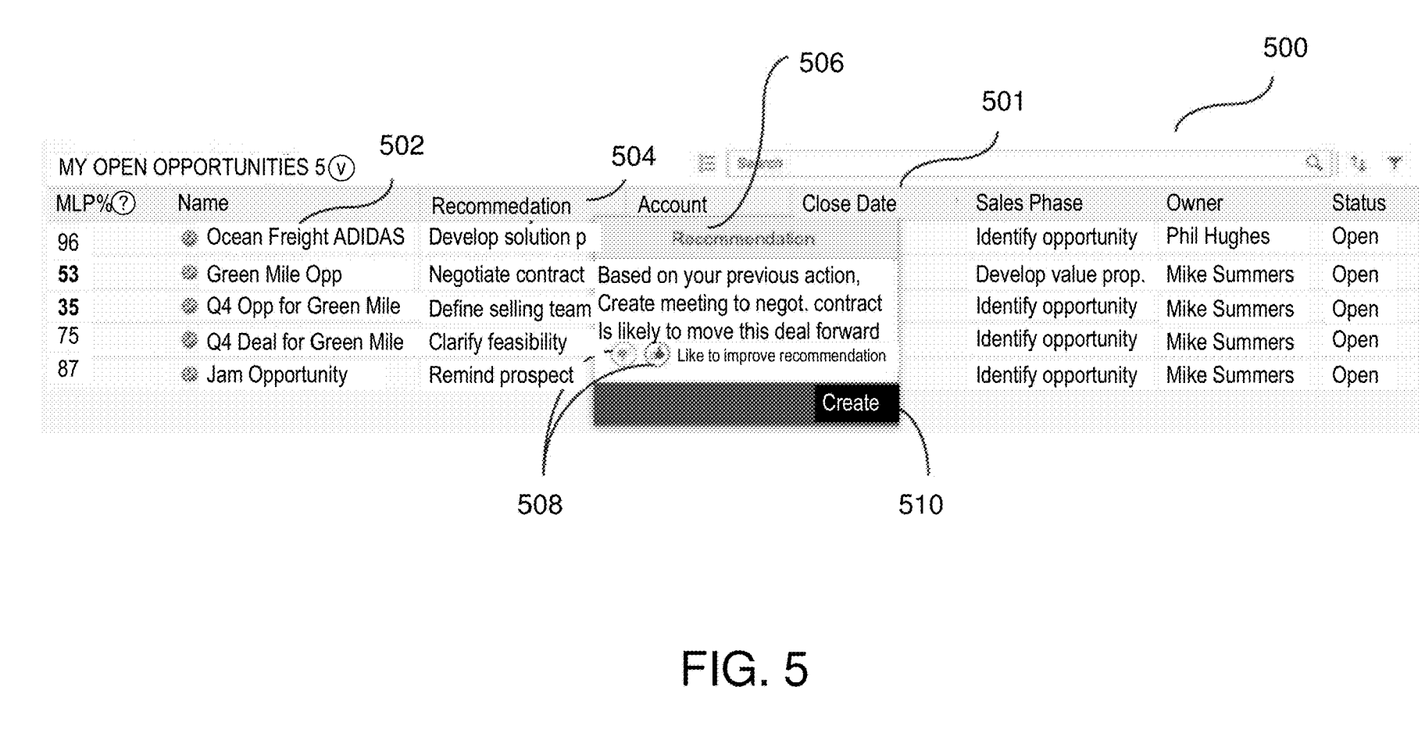
FIG. 5 shows a screenshot of an exemplary user interface.

FIG. 5 shows a screenshot of an exemplary user interface 500. The user interface 500 presents a table 501 associated with a set of current opportunities (or active sales engagements) 502 for a salesperson. The machine learning module 122 may generate a set of recommendations 504 corresponding to the current opportunities. Each recommendation 504 describes one or more next actions to take based on the current data of the state of affairs with the potential customer. The current data include historical engagements with the respective companies and other companies, current priorities of the sales organization, as well as best practices of the sales organization. In short, the current data embody the selling company's organizational knowledge and the framework serves as a personal guide to this vast amount of information.

In response to the user selecting one of the recommendation, a dialog box 506 may be displayed to describe the recommendation in more details (e.g., "Based on your previous action, create meeting to negotiate contract is likely to move this deal forward.") Feedback elements 508 (e.g., thumbs-up and thumbs-down buttons) may be presented to enable the user to select a response (e.g., accept or reject) to the recommendation. The dialog box 506 may further include a user interface element 510 (e.g., button) that enables the user to take action (e.g., create a meeting).

Returning to FIG. 4, at 406, machine learning module 122 determines whether the current playbook should be kept. In some implementations, machine learning module 122 receives a selection from the user via, for example, client device 156 of whether to keep the current playbook. The user may choose to keep the current playbook or switch to another playbook. For example, if there are multiple recommendations and the user feels that none of those applies, he or she may choose to switch to a different playbook.

At 408, in response to the user choosing to keep the current playbook, CRM system 124 collects information about the intended next action. In some implementations, a dialog box may be presented to the user via, for example, client device 156, to enable the user to select either the action recommended by the machine learning module 122 or another action as the intended next action.

At 410, in response to the user choosing to discard the current playbook, machine learning module 122 recommends another playbook for the current opportunity record. More particularly, machine learning module 122 may extract information from the opportunity record and apply the trained machine learning model to the extracted information to generate the playbook recommendation. Machine learning module 122 may recommend a set of "relevant" playbooks, but the user is free to search or choose from the entire database of available playbooks.

At 412, CRM system 124 receives a selection of the new playbook from the user via, for example, client device 156. The user may select the playbook recommended by machine learning module 122 or another playbook as the new playbook.

At 414, CRM system 124 updates the opportunity record with information about the intended next action or the new playbook.

Figure 6:
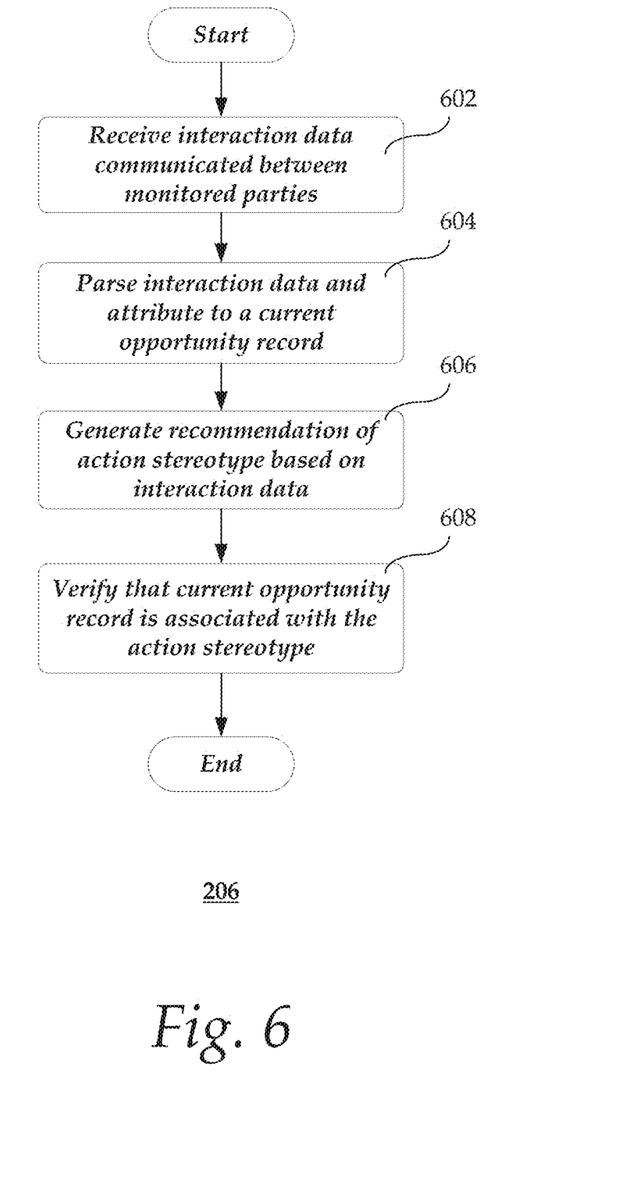
FIG. 6 shows yet another exemplary method of generating a recommendation using the trained machine learning model.

FIG. 6 shows yet another exemplary method 206 of generating a recommendation using the trained machine learning model. The method 206 may be performed automatically or semi-automatically by the system 106, as previously described with reference to FIG. 1. It should be noted that in the following discussion, reference will be made, using like numerals, to the features described in FIGS. 1 and 2.

At 602, machine learning module 122 receives interaction data communicated between monitored parties. The interaction data (e.g., email, text message, telephone conversation, facsimile) may be forwarded by messaging system 125, which is monitoring interaction data communicated between the monitored parties. The interaction data is likely to be associated with an opportunity when it is sent from one monitored party to another monitored party. The monitored parties are identified by, for example, respective sender and receiver contact information (e.g., email addresses, telephone numbers). In a business-to-business (B2B) sales situation, it is rare for the same salesperson to work in more than one opportunity for a given company in the same time frame.

At 604, machine learning module 122 parses the interaction data and attributes it to a current opportunity record. The attribution is successful if a matching current opportunity record is found with high confidence. The interaction data and opportunity record may be matched based on the sender/receiver and/or message contents. If the attribution fails, the CRM system 124 may prompt the user, via client device 156, to manually link the interaction data to a current opportunity record.

At 606, machine learning module 122 generates a recommendation of an action stereotype based on the interaction data. More particularly, machine learning module 122 may extract information from the interaction data and apply the trained machine learning model to the extracted information to determine an action stereotype (i.e., model action). For example, the action stereotype may indicate the action that the user should take, such as up-selling, providing product information, mitigating doubt by providing compliance information, etc. Machine learning module 122 may determine a confidence level on the relevancy of the action stereotype recommendation. If the confidence level is not high enough (i.e., above a predetermined threshold), the machine learning module 122 may not present such recommendation.

In an exemplary scenario, if a customer is buying a burger, the cashier may ask, "Do you want fries with that?" That is an "up-sell to fries" action stereotype. It is possible that the cashier has been taught "If the person buys burgers but has not included any fries, baked potato, or potato chips, then try to offer fries". That sentence may be part of a playbook for walk-in sales during non-festive seasons. Similarly, in the burger situation, current action may be "check the customer's order contents for carbohydrate products" and the next action can be "attempt up-sell and offer fries". If this transaction occurs via email—or any other communication channel in which the machine learning module 122 has access to—machine learning module 122 may pick up the customer's orders from the email and recommend the up-sell action stereotype to the salesperson. The entire message may be provided to the machine learning module 122 and in turn the machine learning module 122 provides recommendations based on its previous experience as well as the current playbook that is in use. Going back to the previous exemplary scenario, if the machine learning module 122 is coupled to a head-set worn by the cashier, the conversation between the customer and the cashier may be monitored and the head-set may whisper to the cashier to make the up-sell.

At 608, machine learning module 122 verifies that the current opportunity record is associated with the action stereotype. More particularly, machine learning module 122 checks to determine whether the determined action stereotype is consistent with the action stereotype in the current opportunity record. If so, the current opportunity record already contains the correct current action. If not, machine learning module 122 initiates the CRM system 124 to prompt the user to update the action stereotype in the current opportunity record via, for example, client device 156.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer system, comprising:
   a non-transitory memory device for storing computer-readable program code; and
   a processor in communication with the non-transitory memory device, the processor being operative with the computer-readable program code to perform operations comprising:
   extracting one or more input attributes from an opportunity record, wherein the extracting comprises parsing the opportunity record;
   inputting the one or more input attributes to a trained machine learning model initially trained with training data comprising historical playbooks associated with engagements that have been completed or have resulted in an outcome, wherein each historical playbook comprises a set of recommended actions to perform in an engagement with a customer;
   based on the one or more input attributes, recommending, by the trained machine learning model, a recommended playbook for the opportunity record, wherein the recommended playbook comprises a plurality of possible recommended actions to perform in a current engagement with a prospective customer;
   receiving a selected playbook from a set of playbooks comprising the recommended playbook;
   assigning the selected playbook as a current playbook of the opportunity record;
   monitoring interaction data communicated between monitored parties of the opportunity record;
   parsing the interaction data communicated between monitored parties of the opportunity record; and
   generating, using the trained machine learning model, a recommendation of a next action out of a plurality of possible recommended actions of the current playbook, wherein the recommendation is based on the current playbook, information extracted from the interaction data, and previous experience.

2. The computer system of claim 1, wherein the processor is operative with the computer-readable program code to generate the recommendation by recommending an action stereotype.

3. The computer system of claim 2, wherein the interaction data comprise an email, text message, telephone conversation or facsimile.

4. A method, comprising:
   (i) receiving training data comprising historical playbooks associated with engagements that have been completed or have resulted in an outcome, wherein each historical playbook comprises a set of recommended actions to perform in an engagement with a customer;
   (ii) training a machine learning model based on the training data;
   (iii) extracting contact information of monitored parties from an opportunity record;
   (iv) monitoring interaction data communicated between the monitored parties;
   (v) generating, using the trained machine learning model, a recommended playbook for the opportunity record, wherein the recommended playbook comprises a plurality of possible recommended actions to perform in a current engagement with a prospective customer;
   (vi) receiving a selected playbook from a set of playbooks comprising the recommended playbook;
   (vii) assigning the selected playbook as a current playbook of the opportunity record;
   (viii) generating, using the trained machine learning model, a recommendation of a next action out of a plurality of possible recommended actions of the current playbook, wherein the recommendation is based on the current playbook and the monitored interaction data communicated between the monitored parties associated with the opportunity record;
   (ix) collecting results of one or more actions performed in response to the recommendation;
   (x) further training the trained machine learning model using the results as training data; and
   (xi) repeating operations (iii)-(x) to generate subsequent recommendations.

5. The method of claim 4, wherein training the machine learning model comprises training a semi-supervised deep learning model.

6. The method of claim 5, wherein the semi-supervised deep learning model comprises neural networks, genetic algorithms, random decision forests, or a combination thereof.

7. The method of claim 4, wherein generating the recommendation comprises recommending a next action for a user to take.

8. The method of claim 7, wherein generating the recommendation comprises generating a win or lose probability of the recommended next action.

9. The method of claim 4, further comprising creating or selecting the opportunity record via a customer relationship management system.

10. The method of claim 4, further comprising:
    extracting contact information of monitored parties from the opportunity record;
    monitoring interaction data communicated between the monitored parties; and
    updating the opportunity record with information extracted from the interaction data.

11. The method of claim 10, wherein the interaction data comprise an email, text message, telephone conversation or facsimile.

12. The method of claim 4, further comprising recommending another playbook in response to a user choosing to discard the current playbook.

13. The method of claim 4, wherein generating the recommendation comprises recommending an action stereotype based on interaction data between monitored parties.

14. The method of claim 13, further comprising parsing the interaction data and attributing the interaction data to the opportunity record.

15. One or more non-transitory computer-readable media having stored thereon program code, the program code executable by a computer to perform steps comprising:
    (i) receiving training data comprising historical playbooks associated with engagements that have been completed or have resulted in an outcome, wherein each historical playbook comprises a set of recommended actions to perform in an engagement with a customer;

(ii) initially training a machine learning model based on the training data;
(iii) extracting contact information of monitored parties from an opportunity record, wherein the contact information identifies communication channels of the monitored parties;
(iv) monitoring interaction data communicated between the monitored parties of the opportunity record via the communication channels identified in the contact information extracted from the opportunity record;
(v) updating the opportunity record with information extracted from the interaction data;
(vi) generating, using the trained machine learning model, a recommended playbook for the opportunity record, wherein the recommend playbook comprises a plurality of possible recommended actions to perform in a current engagement with a prospective customer;
(vii) receiving a selected playbook from a set of playbooks comprising the recommended playbook;
(viii) assigning the selected playbook as a current playbook of the opportunity record;
(ix) generating, using the trained machine learning model, a recommendation based on the current playbook of the opportunity record and the monitored interaction data communicated between the monitored parties associated with the opportunity record;
(x) collecting results of one or more actions performed in response to the recommendation;
(xi) further training the trained machine learning model using the results as training data; and
(xii) repeating operations (iii)-(xi) to generate subsequent opportunity record recommendations.

16. The one or more non-transitory computer-readable media of claim 15, wherein the program code is executable by the computer to generate the recommendation by recommending a playbook or an action stereotype.

* * * * *